US007802729B2

(12) United States Patent
Thayer

(10) Patent No.: US 7,802,729 B2
(45) **Date of Patent: *Sep. 28, 2010**

(54) PORTABLE DATA STORAGE MODULE

(75) Inventor: Peter A. Thayer, Richfield, MN (US)

(73) Assignee: Xata Corporation, Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/145,093

(22) Filed: Jun. 24, 2008

(65) Prior Publication Data

US 2008/0251588 A1 Oct. 16, 2008

Related U.S. Application Data

(63) Continuation of application No. 11/436,880, filed on May 18, 2006, now Pat. No. 7,401,741.

(51) Int. Cl.
*G06K 19/06* (2006.01)

(52) U.S. Cl. ....................................... 235/492; 235/451

(58) Field of Classification Search ................. 235/492, 235/385, 384, 451; 340/10.1, 10.3, 5.6–5.62; 701/202, 213
See application file for complete search history.

(56) References Cited

U.S. PATENT DOCUMENTS

| | | | |
|---|---|---|---|
| 4,234,926 | A | 11/1980 | Wallace et al. |
| 4,879,877 | A | 11/1989 | Hicke |
| 4,882,912 | A | 11/1989 | Fossey |
| 4,885,564 | A | 12/1989 | Vercellotti et al. |
| 4,896,277 | A | 1/1990 | Vercellotti et al. |
| 4,936,104 | A | 6/1990 | Hicke |
| 5,032,821 | A | 7/1991 | Domanico et al. |
| 5,101,643 | A | 4/1992 | Hicke |
| 5,172,321 | A | 12/1992 | Ghaem et al. |
| 5,488,352 | A | 1/1996 | Jasper |
| 5,677,667 | A | 10/1997 | Lesesky et al. |
| 5,907,491 | A | 5/1999 | Canada et al. |
| 5,913,180 | A | 6/1999 | Ryan |
| 6,003,322 | A | 12/1999 | Graham |
| 6,064,299 | A | 5/2000 | Lesesky et al. |
| 6,138,580 | A | 10/2000 | Thoman |
| 6,182,006 | B1 | 1/2001 | Meek |
| 6,349,257 | B1 | 2/2002 | Liu et al. |

(Continued)

OTHER PUBLICATIONS

Peter H. Anderson, "DS1820 Digital Thermometer—Calculating an 8-bit CRC Value," Jun. 1998, 7 pages.

(Continued)

*Primary Examiner*—Daniel St.Cyr
(74) *Attorney, Agent, or Firm*—Shumaker & Sieffert, P.A.

(57) ABSTRACT

A portable data storage module comprises a control module, a wireless communication module, a rewriteable memory and a data transfer button. When the data transfer button is actuated, the portable data storage module wakes from a sleep mode and the control module initiates a data transfer via the wireless communication module with a device. After the data transfer, the portable data storage module reenters the sleep mode. The portable data storage module may be configured to transfer data, such as a trip plan, between a network host and an in-cab driver communication module. The portable data storage module may also store and maintain additional data, such as a driver log.

20 Claims, 4 Drawing Sheets

U.S. PATENT DOCUMENTS

| | | | |
|---|---|---|---|
| 6,411,203 | B1 | 6/2002 | Lesesky et al. |
| 6,608,554 | B2 | 8/2003 | Lesesky et al. |
| 6,619,055 | B1 | 9/2003 | Addy |
| 6,625,584 | B1 | 9/2003 | Bains et al. |
| 6,633,809 | B1 | 10/2003 | Aizono et al. |
| 6,681,987 | B1 | 1/2004 | Ford |
| 6,737,962 | B2 | 5/2004 | Mayor |
| 6,744,352 | B2 | 6/2004 | Lesesky et al. |
| 6,789,391 | B2 | 9/2004 | Graham et al. |
| 6,844,829 | B2 | 1/2005 | Mayor |
| 6,863,222 | B2 | 3/2005 | Slifkin et al. |
| 6,917,801 | B2 | 7/2005 | Witte et al. |
| 6,922,558 | B2 | 7/2005 | Delp et al. |
| 6,946,953 | B2 | 9/2005 | Lesesky et al. |
| 7,015,800 | B2 | 3/2006 | Lesesky et al. |
| 7,212,889 | B2 | 5/2007 | Mann et al. |
| 7,401,741 | B2 * | 7/2008 | Thayer ....................... 235/492 |
| 2003/0109218 | A1 | 6/2003 | Pourkeramati et al. |
| 2005/0033848 | A1 | 2/2005 | Croome |
| 2007/0090965 | A1 | 4/2007 | Mc Call |

OTHER PUBLICATIONS

Xata Fleet Intelligence:: Products:: Onboard fleet management systems that integrate onboard computers, GPS tracking, mobile communications, and driver management software, Xata Corporation, www.xata.com/fleet-communications.html, 2005, 2 pages.

Ember's EM250 ZigBee system-on-a-chip now shipping, Ember Corporation, Mar. 1, 2006, 3 pages.

Compact Integrated Antennas Application Note, Design and Applications for the MC1319x, MC1320x, and MC1321x, Freescale Semiconductor, Inc., Document No. AN2731, Rev. 1.3, Jan. 2006, 26 pages.

Joerg Bertholdt, "Designing wireless sensor network applications," Portable Design™, http://pd.pennnet.com, Mar. 2006, 5 pages.

ZigBee Specification, ZigBee Document 053474r06, Version 1.0, ZigBee™ Alliance, Jun. 27, 2005, 378 pages.

* cited by examiner

DATA SYNCHRONIZATION

PORTABLE DATA STORAGE MODULE

This application is a Continuation of U.S. application Ser. No. 11/436,880, filed May 18, 2006, the entire content of which is incorporated herein by reference.

TECHNICAL FIELD

The invention relates to data storage and transfer, and more particularly, but without limitation, to wireless transfer and portable data storage techniques for data related to shipping, e.g., driving logs or trip planners.

BACKGROUND

A vehicle driver, e.g., a commercial driver, may use predetermined trip plan to plot a route between destinations. For example, a commercial driver may receive a trip plan from a manager prior to beginning a trip. In some instances, a trip plan may be uploaded to a driver communication module within a cab of a semi truck. The driver communication module includes an in-cab interface that provides the driver easy access to the trip plan. For example, a manager or a driver may download a trip plan to a data storage module, such as a flash memory card, from an office computer. The driver may then transfer the trip plan to an in-cab driver communication module by inserting the data storage module into a data storage module port of the driver communication module and accessing the trip plan from the in-cab interface.

SUMMARY

In general, the invention relates to wireless transfer and portable data storage techniques useful for the trucking industry or other applications. The invention makes use of a portable data storage module, which may be similar in size and appearance to a key FOB commonly used to wirelessly lock and unlock vehicles. The portable data storage module may communicate wirelessly with a network computer for data transfers. Such data transfers may include uploading trip plans and/or downloading driving logs or other driving history information. Conversely, the portable data storage module can also communicate wirelessly with a driver communication module to upload a trip plan and/or download driving history information.

As referred to herein, a communication includes one or more transmissions between two devices. E.g., a communication may include an initiate communication request followed by a reply to the request from a device receiving the request. Such a communication includes at least two transmissions: the initiate communication request and the reply.

To conserve battery power, embodiments of the invention contemplate that the portable data storage module initiates all communications between the portable data storage module and one or more devices. For example, a portable data storage module may function as a ZigBee end device and communicate using a ZigBee wireless standard, which provides for low-power wireless transmissions. The portable data storage module may include only a single upload/download button to initiate all communications, e.g., communications with a network computer or a driver communication module. Depending on what device, if any, the portable data storage module connects to, and the current data stored in memory of the portable data storage device, the portable data storage module may download data, upload data, or upload and download data.

In one embodiment, the invention is directed to a portable data storage module comprising a control module, a wireless communication module, a rewriteable memory and a data transfer button. When the data transfer button is actuated, the portable data storage module wakes from a sleep mode and the control module initiates a data transfer via the wireless communication module with a device. After the data transfer, the portable data storage module reenters the sleep mode.

In another embodiment, the invention is directed to a method comprising sending an initiate communication request from a portable data storage module as a first wireless transmission, receiving a response to the initiate communication request from a device as a second wireless transmission at the portable data storage module, identifying the device that sent the second wireless transmission at the portable data storage module and transferring data between the portable data storage module and the device based on the identification of the device via a third wireless transmission.

In another embodiment, a system comprises a computer including a first wireless communication module, a portable data storage device including a second wireless communication module, wherein the portable data storage device downloads uplink data from the computer via a first wireless communication, wherein the uplink data includes a trip plan and a driver communication module including a third wireless communication module. The portable data storage device uploads the uplink data to the driver communication module via a second wireless communication.

Embodiments of the invention may provide one or more of the following advantages. For example, embodiments of the invention may actively manage memory to prevent erroneous data transfers. For example, a portable data storage module may delete data in memory after the data has been uploaded and acknowledged by a network computer or a driver communication module. With respect to trip plan data, the portable data storage module may delete the trip plan data from memory after downloading such trip data to a driver communication module. This may prevent a driver from mistakenly downloading the trip plan a second time, when it is no longer current.

Compared to a passive data storage module that communicates via a physical interface to computers and to driver communication modules, embodiments of the invention may provide more reliable data transfer. For example, a port for a data storage module within the cab of a truck may become dirty and prevent a proper connection to a data storage module. In addition, the invention can add convenience to drivers in the trucking industry (or other users in other applications), by simplifying data transfers of information needed by the drivers.

Another benefit provided by the wireless communication capability is that the portable data storage module can include an alert capability. For example, pressing an alert button may cause the portable data storage module to send out a wireless alert message to any and all available devices. The available devices may respond to the alert massage in a manner that assists the driver who pressed the alert button. For example, a driver communication module may sound an alarm, like a car alarm, and/or if connected to a network such as a public cellular network, forward the alert to emergency services.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
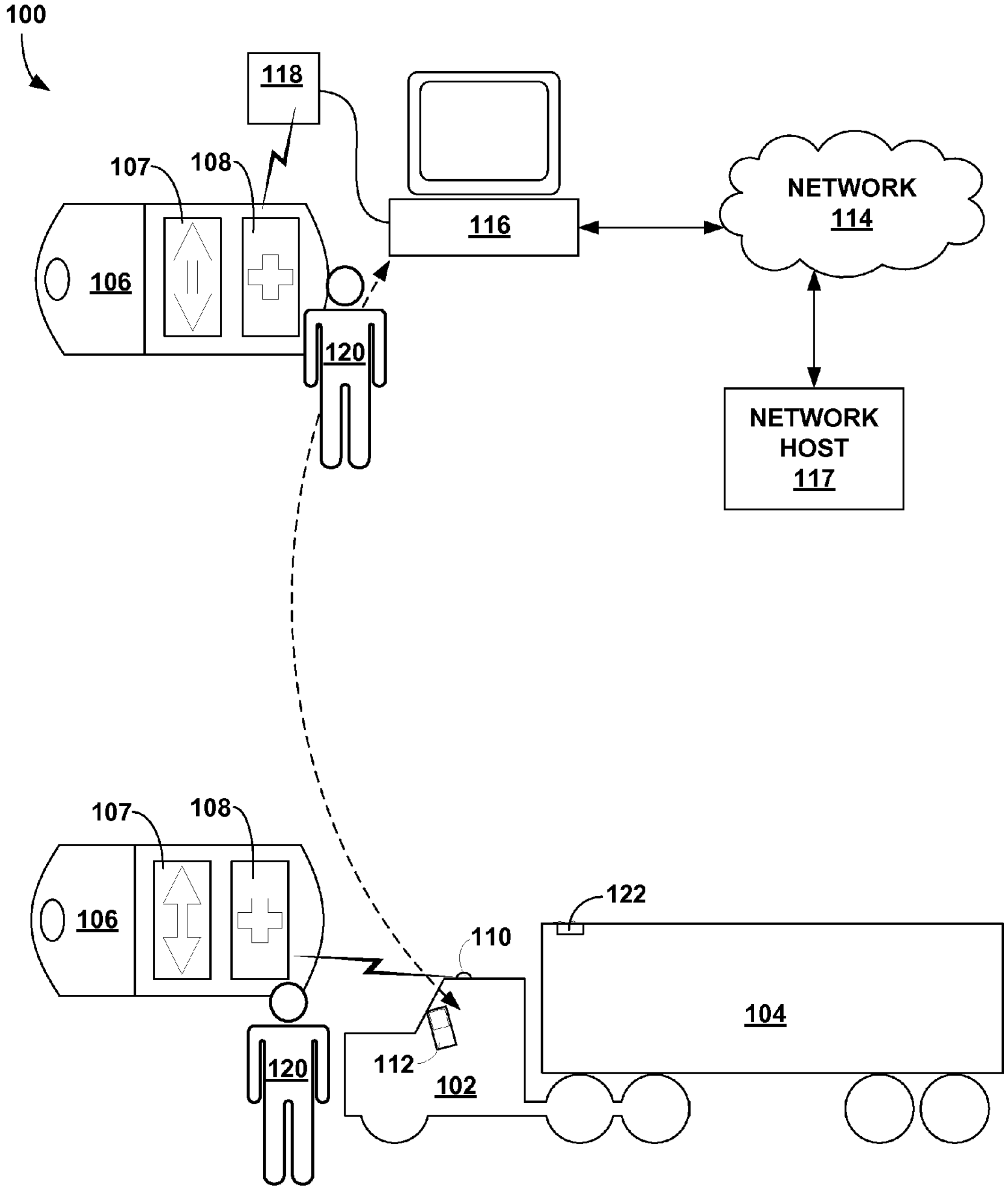
FIG. 1 is a conceptual diagram illustrating a system that provides for communication between a networked computer, a portable data storage module and a driver communication module.

FIG. 1 illustrates system 100, which provides for wireless communication between networked computer 116, portable data storage module 106 and driver communication module 112. System 100 allows data transfer from a network host 117 on network 114 to data storage module 106 via computer 116 and wireless communication module 118. Data may also be transferred in the reverse direction, i.e., from data storage module 106 to network 114. System 100 also allows data transfers between portable data storage module 106 and driver communication module 112.

Computer 116 is connected to network 114, which includes network host 117. For example, network 114 may be local area network (LAN), a wide area network (WAN), or a global network such as the Internet. Network host 117 includes a database that correlates drivers to data storage modules. For example, each driver may be assigned to exactly one portable data storage module. In this case, the database correlates driver 120 with portable data storage module 106. Network host 117 also includes truck information and trip plans. Network host 117 may also associate each trip plan with a driver, a cab and/or a trailer.

Cab 102 includes a driver communication module 112 with an in-cab interface. Driver communication module 112 includes antenna 110. Antenna 110 is used to send and receive transmissions with portable data storage module 106. Antenna 110 can also be used to communicate with other driver communication modules. For example, multiple driver communication modules may form a mesh such that data may be transferred via multiple driver communication modules to reach a destination. Antenna 110 is also used to identify trailer 104, which is identified by wireless identification module 122.

Driver 120 uses portable data storage module 106 to transfer data between computer 116 and driver communication module 112. Driver communication module 106 may be configured to hold three different types of data: uplink data, which is data to be transferred from computer 116 to driver communication system 112, downlink data, which is data to be transferred from driver communication system 112 to a network host 117 via computer 116, and retained data, which is data maintained in memory of portable data storage module 106. As an example, retained data in portable data storage module 106 may include a driver log for driver 120.

Communication between computer 116 and driver communication module 112 via portable data storage module 106 may generally occur as follows. At the beginning of a shift, driver 120 may bring portable data storage module 106 within range of wireless communication module 118 and press upload/download button 107. Upload/download button wakes portable data storage module 106 from a sleep mode, and portable data storage module 106 initiates a communication with an available device, in this case computer 116. Once data storage module 106 initiates a communication with computer 116, computer 116 notifies network host 117 on network 114. Network host 117 transfers a trip plan specifically intended for driver 120 and cab 102 to computer 116. In the event that portable data storage module 106 already includes a trip plan in memory, portable data storage module 106 replaces the trip plan in memory with the current downloaded trip plan. After the upload, portable data storage module 116 reenters the sleep mode.

Next, driver 120 carries portable data storage module 106 to cab 102. Driver 120 enters his unique user ID into the driver communication module 112. Driver communication module 112 is now ready to accept data from the portable data storage device associated with this driver ID. Driver 120 again presses upload/download button 107. Portable data storage module 106 wakes from the sleep mode, and portable data storage module 106 initiates a communication with an available device, in this case, driver communication module 112. Driver communication module 112 confirms that portable data storage module 106 is associated with the driver ID. Portable data storage module 106 uploads the trip plan to driver communication module 112. Once driver communication module 112 acknowledges receipt of the trip plan, portable data storage module 106 deletes the trip plan from memory.

At the end of the shift, driver 120 logs off driver communication module 112. Driver communication module 112 is then ready to acknowledge a request for data from portable data storage module 106. Driver 120 again presses upload/download button 107 within range of driver communication module 112. Portable data storage module 106 initiates a communication with driver communication module 112, and driver communication module 112 confirms to portable data storage module 106 that it is the correct driver communication module. Portable data storage module 106 downloads a downlink message, e.g., route data intended for network host 117 on network 114 and downloads retained data, e.g., updates for a driver log for driver 120 that is kept in memory of portable data storage module 106.

After downloading the downlink message, driver 120 carries portable data storage module 106 in range of wireless communication module 118. Driver 120 presses upload/download button 107 to initiate another communication. Computer 116 responds to the initiate communication request and identifies itself as being connected to network host 117. Portable data storage module 106 then uploads the route data to computer 116. Once computer 116 acknowledges receipt of the route data, portable data storage module 106 deletes the route data from memory. Portable data storage module 106 may also download a new trip plan for another shift if available from computer 116. Driver 120 would then not need to connect portable data storage module 106 to computer 116 at the beginning of driver 120's next shift.

In some embodiments, after sending out an initiate communication request, portable data storage module 106 operates differently depending on the identity of the responding device(s). For example, portable data storage module 106 responds to computer 116 by uploading downlink data in memory to computer 116, but responds to driver communication module 112 by uploading uplink data in memory to driver communication module 112. As another example, portable data storage module 106 may not upload uplink data to a driver communication module other than driver communication module 112. For example, if a driver communication module other than driver communication module 112 responds to an initiate communication request from portable data storage module 106, portable data storage module 106 may simply ignore the response.

Portable data storage module 106 also includes alert button 108. Pressing alert button 108 causes portable data storage module 106 to send out a wireless alert message to any and all available devices including driver communication modules and other wireless devices in the system. To prevent inadvertent alerts, alert button 108 may need to be held for a period of time, such as two seconds, before portable data storage module 106 will send out an alert. Another technique to prevent inadvertent alerts is to require both buttons to be pressed simultaneously or held simultaneously before portable data storage module 106 sends out an alert. The available devices respond to the alert massage in a manner that assists the driver who pressed the alert button. For example, if driver communication module 112 receives the alert, driver communication module 112 may sound an alarm from cab 102. In the event that driver communication module 112 is connected to a network such as a public cellular network or satellite communication network, driver communication module 112 will also forward the alert to network host 117 and/or emergency services.

Receiving an alert message is just one example of how network host 117 provides centralized oversight for an entire fleet of trucks. For example, network host 117 may be used to manage a trucking company with multiple truck yards, each having a networked computer with a connection to network 114 and network host 117. Every driver in the trucking company can be assigned a portable data storage module with a unique identifier. Because each driver uses a uniquely identified portable data storage module, a remote administrator can look to records on network host 117 to see which drivers are using which trucks and the drivers' current trip plans. In this manner, network host 117 can be used to by administrators to manage and oversee the entire fleet of trucks stationed at multiple locations. Another benefit of network host 117 is that a remote administrator can make changes to multiple trip plans at the same time, e.g., to avoid road construction.

Figure 2A:
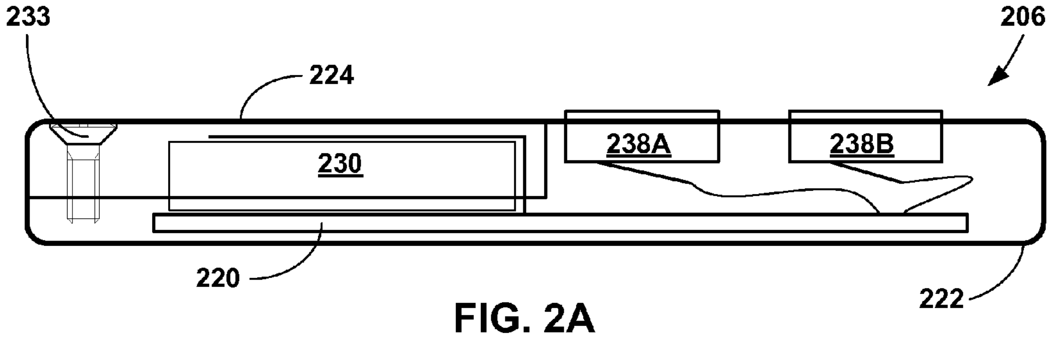
FIG. 2A is a cross-sectional side view of an exemplary portable data storage module according to an embodiment of the invention.
Figure 2B:
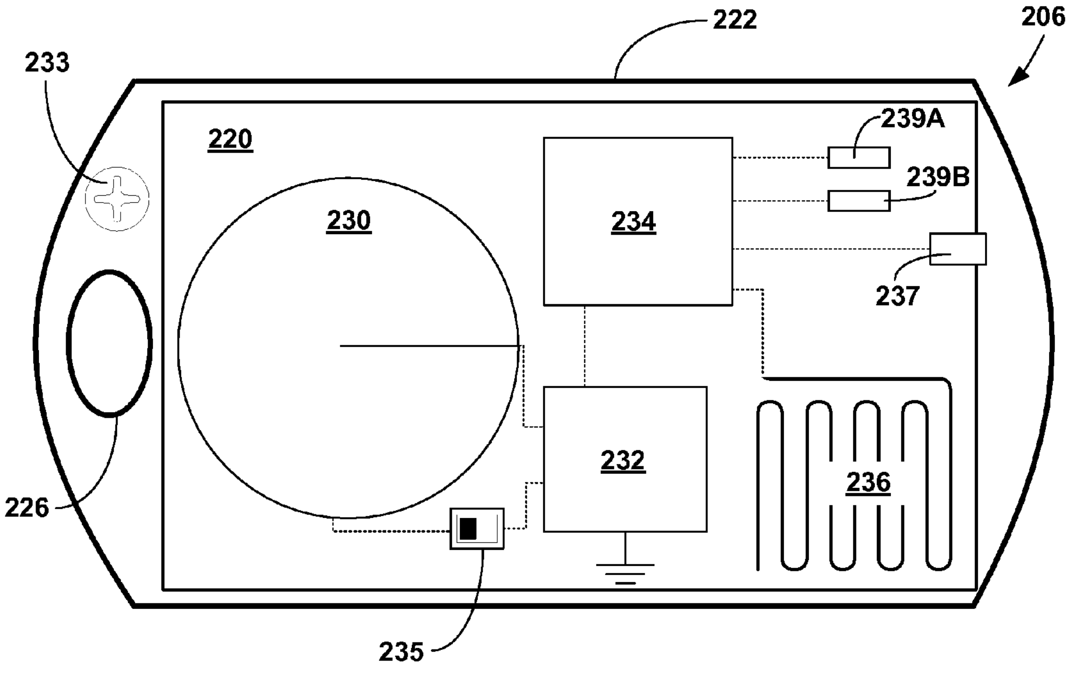
FIG. 2B is a cross-sectional top view of the portable data storage module shown in FIG. 2A.

FIGS. 2A-2B are side and top cross-sectional views respectively illustrating portable data storage module 206. For example, portable data storage module 206 may be the same as portable data storage module 106 in FIG. 1. Portable data storage module 206 includes control module 234, antenna 236, antenna jack 237, and electrodes 239A-239B (electrodes 239), each of which are mounted to printed circuit board 220. Electrodes 239 provide connections to buttons 238A-238B (buttons 238). For example, buttons 238 may include one upload/download button and one alert button. The power supply system for portable data storage module 206 includes battery 230, on/off switch 234 and voltage regulator 232. Portable data storage module 206 has a wireless communication capability, provided in-part by one or both of internal antenna 236 and antenna jack 239.

Printed circuit board 220 is mounted within housing 222. Housing 222 forms loop 226, which allows portable data storage module 206 to be mounted to a key chain. Housing 222 includes cover 224, which provides access to battery 230 and on/off switch 235. Cover 224 is secured to the rest of housing 222 by screw 233.

Portable data storage module 206 has a small size to allow portability. For example, portable data storage module 206 may have a form factor of less than 10 centimeters (cm) by 10 cm. As examples, portable data storage module 206 may have a form factor of less than 10 cm by 5 cm or of less than 6 cm by 4 cm. As another example, portable data storage module 206 may have form factor of approximately 6 cm by 2.5 cm. Portable data storage module 206 has a thickness of less than 2 cm. As examples, portable data storage module 206 may have a thickness of less than 1.5 cm, or of less than 1 cm. For example, portable data storage module 206 may have a thickness of approximately 0.7 cm.

Control module 234 operates the electronic components in portable data storage module 206 including antenna 236. Control module 234 also receives inputs from buttons 238 via electrodes 239. As an example, control module 234 may include an EM250 ZigBee system-on-a-ship (SoC) available from Ember Corporation of Boston, Mass. The EM250 chip includes a programmable microprocessor, a 2.4 GHz radio, a network protocol stack, memory including 5 kilobytes of RAM and 128 kilobytes of rewriteable flash memory, and operating system software. In other embodiments, control module 234 may include a different chip and/or separate and distinct components.

Control module 234 communicates using one or both of internal antenna 236 and antenna jack 239. Internal antenna 236 may be printed directly on circuit board 220 and may have a size of 1.2 square centimeters or less. Antenna jack 239 allows a different antenna (not included in portable data storage module 206) to be connected to printed circuit board 220 as a build option for portable data storage module 206. For example, a different antenna may be larger than antenna 236 and provide increased wireless communication range for portable data storage module 206.

The power supply system for portable data storage module 206 includes battery 230, on/off switch 235 and voltage regulator 232. On/off switch 235 is provided to prevent discharge of battery 230 prior to activation of portable data storage module 206. Once portable data storage module 206 is activated, e.g., activation may include correlating portable data storage module 206 with a driver in a database, on/off switch 235 may be left in the on position. Housing 222 prevents direct access to on/off switch 234.

Battery 230 provides the power source for portable data storage module 206. Battery 230 may be, for example, a lithium-ion coin-type battery, containing a total power of about 1000 milliampere-hours. For example, battery 230 may be a Panasonic BR2477A/GAE, which has a size of about 12.5 millimeters (mm) by 2.5 mm. As another example, battery 230 may be a ½ AAA size battery. Other batteries may also be used for portable data storage module 206. Battery 230 connects through on/off switch 235 to voltage regulator 232. Voltage regulator 232 is connected to a ground plane of circuit board 220 and provides direct power to control module 234.

Portable data storage module 206 has a long battery life. For example, a large data transfer may consume approximately 3 milliamps of power. Battery 330 provides enough power for approximately 300 large data transfers, but smaller data transfers consume less power. As an example, battery 330 may need to be replaced approximately twice a year.

Figure 3:
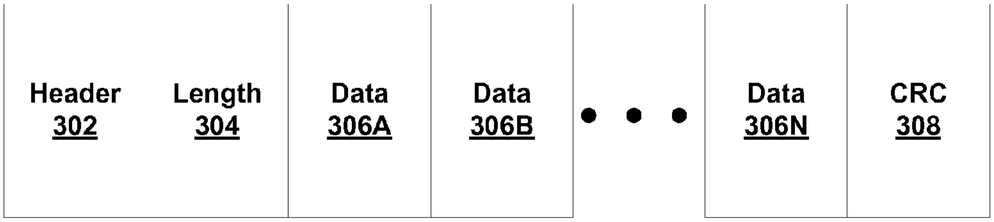
FIG. 3 is a block diagram illustrating an exemplary data structure for communications between a portable data storage module and other devices.

FIG. 3 illustrates an exemplary data structure for communications between a portable data storage module and other devices, such as driver communication modules and computers with wireless communication modules. Messages begin with header 302, which is an 8-bit identifier of the message source and type. Header 302 is followed by message length 304, which is an 8 bit unsigned length value of the data blocks. Bytes allocated to header 203, length 304 and CRC (cyclic redundancy check) 308 are not included in the calculation of message length for length 304. Data blocks 306A and 306B to 306N (data 306) follow length 304. After data blocks 306, transmissions are completed with CRC 308. CRC 308 allows provides a means to confirm a destination received all transmitted data in a packet.

Using a ZigBee wireless protocol, data is transferred in 64-byte packets. For this reason, a single wireless message that includes more than 61 bytes of data is distributed among multiple packets. In other instances, some messages may include no data blocks 306. Such messages me be used, for example, to notify a destination device that the transmitting device is in range and ready to accept a communication. An identification of the transmitting device is not required as part because a destination device uses the MAC (media access control) address to determine the identity of the transmitting device. For example, a portable data storage module may transmit a message having no data blocks in range to initiate a communication with either a networked computer or a driver communication module. The portable data storage module may then look to receive an immediate response to determine which, if any device(s) are in range and willing to communicate with the portable data storage device. The immediate response may also be a message having no data blocks. These initial transmissions may be followed by additional transmissions with data blocks containing uplink, downlink or other data.

Figure 4:
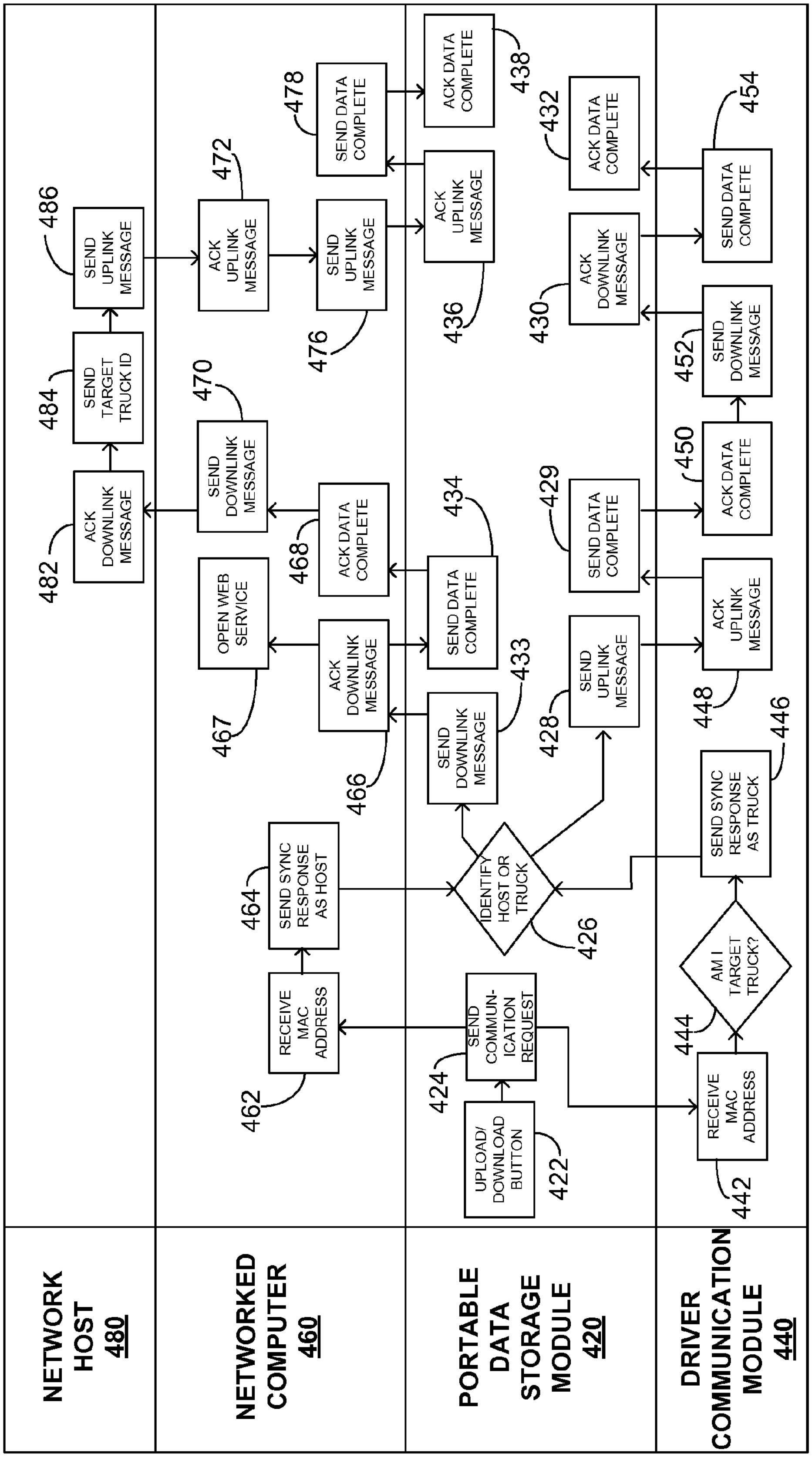
FIG. 4 is a flowchart illustrating exemplary data synchronization techniques for a network host, a networked computer, a portable data storage module and a driver communication module.

FIG. 4 is a flowchart illustrating exemplary data synchronization techniques for a network host, a networked computer, a portable data storage module and a driver communication module. Actions taken by the network host are shown in row 480; actions taken by the networked computer are shown in row 460; actions taken by the portable data storage module are shown in row 420; actions taken by the driver communication module are shown in row 440. For clarity, the data synchronization techniques shown in FIG. 4 are discussed with respect to system 100 from FIG. 1. Similar data synchronization techniques may be practiced in systems other than system 100.

All communications are initiated by portable data storage module 106 when driver 120 presses upload/download button 107 (422). After driver 120 presses upload/download button 107, portable data storage module 106 transmits a communication request (424). For example, the communication request may comprise a transmission including only a header byte, a message length byte, which equals zero, and a CRC byte, but no data blocks. The transmission includes the media access control (MAC) address for portable data storage module 106. All devices in range of portable data storage module 106 receive communication request and identify the communication request as having been sent by portable data storage module 106.

For example, the communication request may be received by computer 116, which identifies portable data storage module 106 from the MAC address (462). Computer 116 then sends a response indicating that it is in range for a communication session with portable data storage module 106 (464). For example, computer 116's response may simply be a transmission including only a header byte, a message length byte, which equals zero and a CRC byte, but no data blocks. Portable data storage module 106 identifies the response as having come from computer 116 (426). For example, portable data storage module 106 may identify the response as having come from computer 116 according to the MAC address of wireless communication module 118.

After portable data storage module 106 identifies the response as having come from computer 116, portable data storage module 106 sends a downlink message stored in memory, if any, to computer 116 (433). Computer 116 then sends an acknowledgement to confirm receipt of the downlink message after verifying the message with the CRC included in the downlink message (466). Because the downlink message may include more data than can fit into a single packet, steps 433 and 466 may be repeated for each packet of the downlink message. After sending the last packet of the downlink message, portable data storage module 106 sends a data complete notification to computer 116 (434). Computer 116 then sends an acknowledgement to confirm receipt of the data complete notification (468). After receiving the acknowledgement to confirm receipt of the data complete notification, portable data storage module 106 may delete the downlink message from memory.

Once computer 116 begins receiving the downlink message, computer 116 opens a connection with network host 117 (467). For example, network host 117 may be a web-based service. In other embodiments, network host 117 may be a computer within a private network, such as an Ethernet network or other LAN. Alternatively, computer 116 may perform the tasks of network host 117 directly. After acknowledging the data complete notification (468), computer 116 forwards the downlink message (if any) to network host 117 (470). Network host 117 then sends an acknowledgement to confirm receipt of the downlink message (482). In the event there is no downlink message, computer 116 may simply inform network host that computer 116 is having a communication with portable data storage module 106.

After the downlink message (if any) is transmitted to network host 117, network host 117 forwards an uplink message to computer 116 (486). For example, the uplink message may include a trip plan. The uplink message may also include an identification of a target truck for which it is intended (484). In other embodiments, an uplink message may be associated only with portable data storage module 106 and driver 120. Upon receipt of the uplink message, computer 116 acknowledges receipt of the uplink message (472).

Computer 116 then forwards the uplink message to portable data storage module 106 (476). Portable data storage module 106 sends an acknowledgement to confirm receipt of the uplink message after verifying the message with the CRC included in the uplink message (436). Because the uplink message may include more data than can fit into a single packet, steps 476 and 436 may be repeated for each packet of the uplink message. After sending the last packet of the uplink message, computer 116 sends a data complete notification to portable data storage module 106 (478). Portable data storage module 106 then sends an acknowledgement to confirm receipt of the data complete notification (438). After both sending the downlink message and receiving the uplink message from computer 116, portable data storage module 106 reenters sleep mode to conserve battery power.

Returning to step 424, if driver communication module 112 receives the communication request sent by portable data storage module 106, driver communication module 112 determines if it is part of the target truck (444). For example, driver communication module 112 may determine it is part of the target truck the target truck if driver 120 has logged in or out of the driver communication module 112 within the last few minutes. In this case, driver communication module 112 is part of the target truck and sends a response indicating that it is in range for a communication session with portable data storage module 106 (446). For example, driver communication module 112's response may be a transmission having no data blocks.

In the event a driver communication module that is not the intended target receives the communication request sent by portable data storage module 106, that the driver communication module should not respond to portable data storage module 106. However, if the driver communication module of the target truck is available as part of an active mesh network, the recipient driver communication module may forward the communication request to the driver communication module of the target truck. In this case, the driver communication module of the target truck may communicate with portable data storage module 106 via the mesh network.

Portable data storage module 106 identifies the response as having come from driver communication module 112 (426). For example, portable data storage module 106 may identify the response as having come from driver communication module 112 according to the MAC address of driver communication module 112.

After portable data storage module 106 identifies the response as having come from driver communication module 112, portable data storage module 106 sends a uplink message stored in memory, if any, to driver communication module 112 (428). Driver communication module 112 replies with an acknowledgement to confirm receipt of the uplink message after verifying the message with the CRC included in the uplink message (448). Because the uplink message may include more data than can fit into a single packet, steps 428 and 448 are repeated for each packet of the uplink message. After sending the last packet of the uplink message, portable data storage module 106 sends a data complete notification to driver communication module 112 (429). Driver communication module 112 replies with an acknowledgement to confirm receipt of the data complete notification (450). After receiving the acknowledgement to confirm receipt of the data complete notification, portable data storage module 106 may delete the uplink message from memory.

Next, driver communication module 112 sends a downlink message, if any, to portable data storage module 106 (452). Portable data storage module 106 replies with an acknowledgement to confirm receipt of the downlink message after verifying the message with the CRC included in the downlink message (430). Because the downlink message may include more data than can fit into a single packet, steps 452 and 430 may be repeated for each packet of the downlink message. After sending the last packet of the downlink message, driver communication module 112 sends a data complete notification to portable data storage module 106 (454). Portable data storage module 106 sends an acknowledgement to confirm receipt of the data complete notification (432). After both sending the uplink message and receiving the downlink message from driver communication module 112, portable data storage module 106 reenters sleep mode to conserve battery power.

Driver communication module 112 may respond to the same communication requests that computer 116 responds to if both are simultaneously within range of portable data storage module 106. If this occurs, portable data storage module 106 may communicate with both computer 116 and driver communication module 112 simultaneously. In other embodiments, portable data storage module 106 may selectively communicate with just one of computer 116 or driver communication module 112. For example, if driver communication module 112 includes downlink data in memory, it may forward the downlink message to computer 116 prior to continuing a communication with driver communication module 112.

Figure 5:
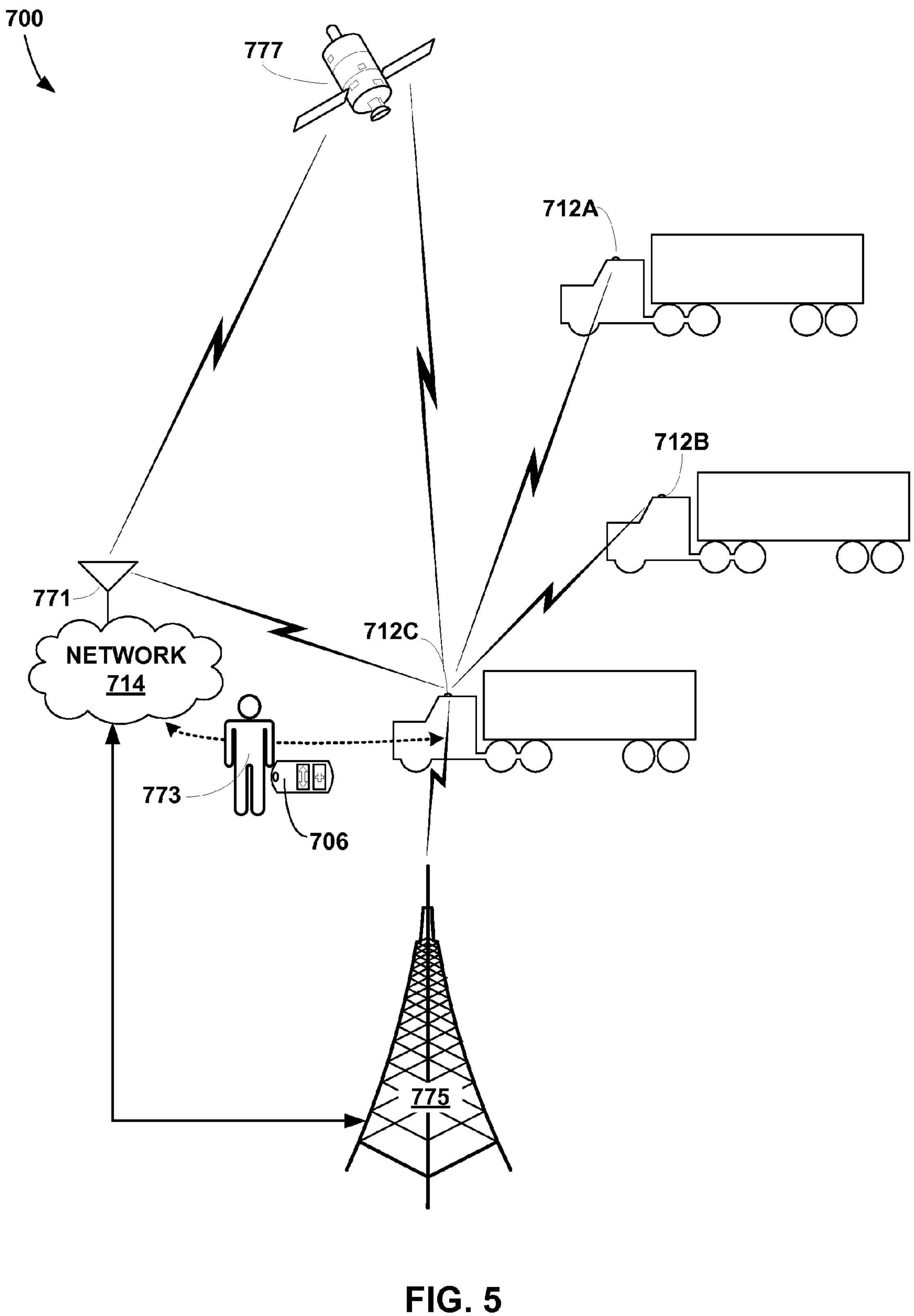
FIG. 5 is a conceptual diagram illustrating exemplary techniques for transmitting data throughout a system that includes a portable data storage module and a network.

FIG. 5 illustrates exemplary techniques for transmitting data throughout system 700, which includes portable data storage module 706 and network 714. Network 714 may be, for example, a small private network such as a proprietary Ethernet network, a global public network such as the Internet, or any private or public network of any size or network configuration. For example, network 714 may include a network host (not shown in FIG. 7). System 700 also includes driver communication modules 712A-712C (driver communication modules 712) which are configured to operate as part of a mesh network.

Downlink data from each of driver communication modules 712 may be collected by driver communication modules 712C and then downloaded by portable data storage module 706. Driver 773 may then transfer the downlink data for each of driver communication modules 712A-712C to network 714 in a single step using techniques as previously described herein. This may simplify the process of transferring downlink data from driver communication modules 712 to network 714.

In addition to communicating directly with driver communication modules 712A and 712B and to network 714 via portable data storage module 706, driver communication module 712C may communicate to network 714 using one or more of the techniques shown in FIG. 7. For example, driver communication module 712C may communicate via cellular system 775, satellite system 777 or through a private wireless network 771. For example, private wireless network 771 may operate using a ZigBee wireless standard. These communication techniques provide an alternative to portable data storage module 706 and may be useful, for example, to communicate urgent information to network 714. For example, these communication techniques may be used to immediately contact emergency services via network 714 if driver 773 presses an alarm button on portable data storage module 706.

Various embodiments of the invention have been described. Embodiments of the invention as described herein have described a portable data storage module that communicates wirelessly for use in the trucking industry. However, portable data storage modules within the scope of the current invention may be used for a variety of applications including general data storage and transfer. For example, an office worker may transfer electronic files from a work computer to a home computer using a portable data storage module. As another example, a portable data storage module may be used to collect data from a plurality of devices before transferring it to a host. Such applications include, but are not limited to, collecting utility meter readings, collecting data from cash registers and others.

These and other embodiments are within the scope of the following claims.

The invention claimed is:

1. A portable data storage module comprising:

a control module;

a wireless communication module;

a rewriteable memory; and a data transfer button, wherein, when the data transfer button is actuated, the portable data storage module wakes from a sleep mode and the control module initiates a data transfer via the wireless communication module with a device, wherein after the data transfer, the portable data storage module reenters the sleep mode, and wherein when the portable data storage module is in the sleep mode, the portable data storage module can not send or receive communications.

2. The portable data storage module of claim 1, wherein the data transfer comprises uploading data from the device and storing the data in the rewriteable memory.

3. The portable data storage module of claim 2, wherein the device is a computer, wherein the data includes a trip plan.

4. The portable data storage module of claim 1, wherein the data transfer comprises downloading data from the rewriteable memory to the device.

5. The portable data storage module of claim 4, wherein the device is a driver information module, wherein the data includes a trip plan.

6. The portable data storage module of claim 4, wherein the portable data storage module receives an acknowledgement for the data from the device and then the control module deletes the data from the rewriteable memory in response to the acknowledgement.

7. The portable data storage module of claim 1, further comprising an alert button, wherein when the alert button is pressed the portable data storage module transmits an alert message via the wireless communication module.

8. The portable data storage module of claim 1, further comprising a loop that allows the portable data storage module to be connected to a key chain.

9. The portable data storage module of claim 1, wherein the portable data storage module communicates using a ZigBee wireless standard.

10. A method comprising:

sending an initiate communication request from a portable data storage module as a first wireless transmission;

receiving a response to the initiate communication request from a device as a second wireless transmission at the portable data storage module;

identifying the device that sent the second wireless transmission at the portable data storage module; and transferring data between the portable data storage module and the device based on the identification of the device via a third wireless transmission.

11. The method of claim 10, wherein transferring data comprises uploading data from the device and storing the data in a rewriteable memory of the portable data storage module.

12. The method of claim 11, wherein the device is a computer, wherein the data includes a trip plan loaded on the portable data storage module.

13. The method of claim 10, wherein the data transfer comprises downloading data from the rewriteable memory of the portable data storage module to the device.

14. The method of claim 13, wherein the device is a driver information module, wherein the data includes a trip plan loaded on the portable data storage module.

15. The method of claim 13, wherein the portable data storage module receives an acknowledgement for the data from the device and deletes the data from a rewriteable memory in response to the acknowledgement.

16. The method of claim 10, wherein the initiate communication request includes a device identifier that identifies the device to the portable data storage module.

17. The method of claim 10, further comprising entering a sleep mode in the portable data storage module after transferring the data between the portable data storage module and the device.

18. The method of claim 10, wherein the first, the second and the third wireless transmissions each conform to a ZigBee wireless standard.

19. The method of claim 10, wherein, prior to the sending the initiate communication request, the portable data storage module is in a sleep mode, wherein when the portable data storage module is in the sleep mode, the portable data storage module can not send or receive communications.

20. The method of claim 19, wherein the data storage module includes a data transfer button, the method further comprising receiving an input from the data transfer button with the portable data storage module, wherein receiving the input from the data transfer button wakes the portable data storage module from the sleep mode and causes the portable data storage module to send the initiate communication request from the portable data storage module as the first wireless transmission.

* * * * *